Feb. 21, 1933.  P. W. FASSLER  1,898,873
PORTABLE WELDER
Filed Dec. 28, 1929  2 Sheets-Sheet 1

INVENTOR.
Peter W. Fassler
BY
Stuart E. Barnes
ATTORNEY.

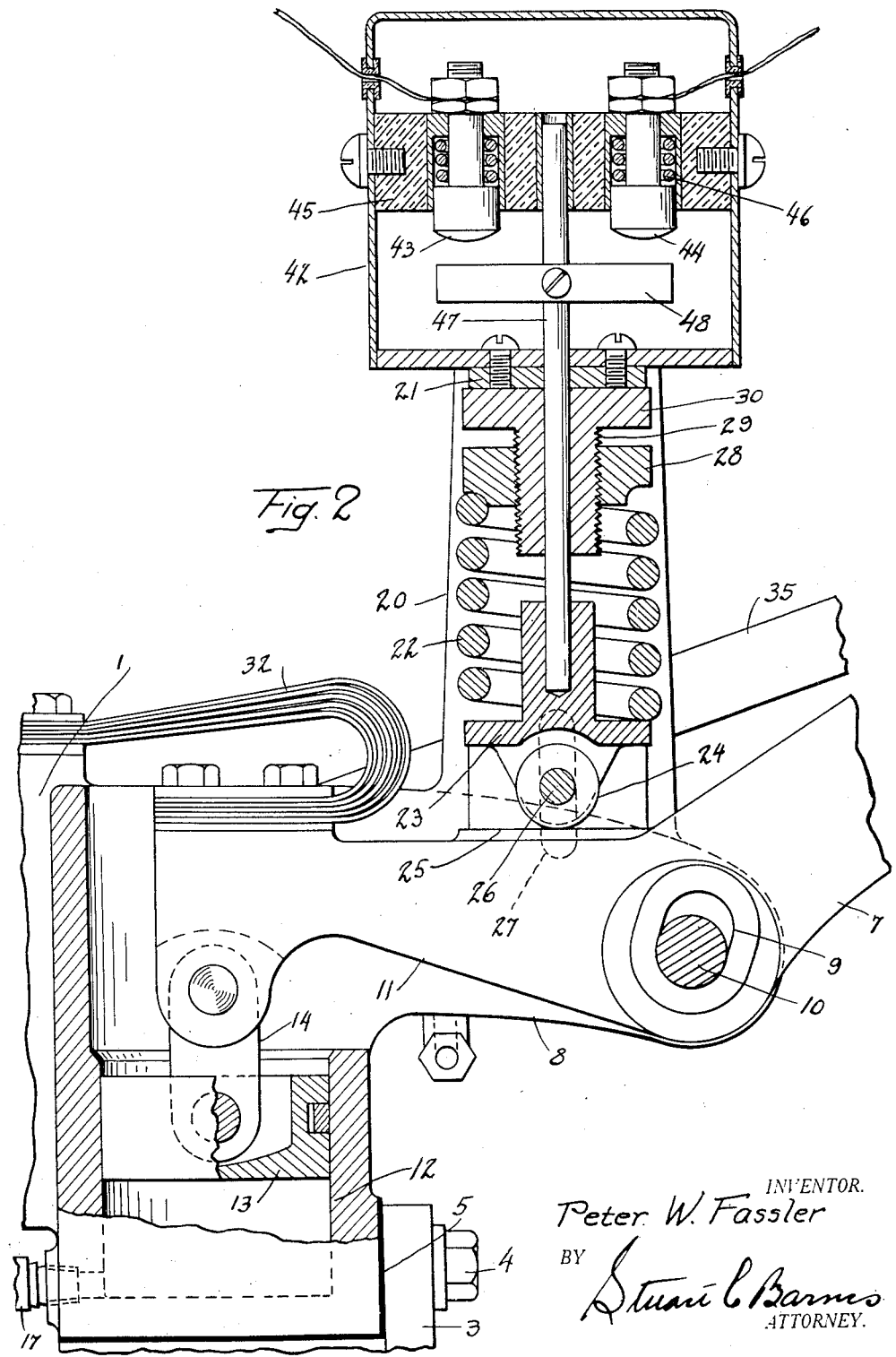

Patented Feb. 21, 1933

1,898,873

UNITED STATES PATENT OFFICE

PETER W. FASSLER, OF DETROIT, MICHIGAN, ASSIGNOR TO GENERAL MOTORS CORPORATION, OF DETROIT, MICHIGAN, A CORPORATION OF DELAWARE

PORTABLE WELDER

Application filed December 28, 1929. Serial No. 417,070.

This invention has to do with a welding machine, and the invention relates particularly to a machine adapted for making a spot weld and which is of the so-called portable type.

The nature of some work is such that it is more advantageous to move the welding machine with respect to the work than it is to move the work with respect to the welding machine. This may be due to the large and cumbersomeness of the work to be welded, or due to the inaccessibility of the particular work where the welds are to be made. In portable welders, problems arise which are not encountered in the non-portable type; for example, the problem arises as to the manner of effecting operation of the mechanism on the portable machine, the manner in which the controlling electrical switch is to be operated and other related questions.

The present invention aims to provide a portable welding tool which is constructed so that its total weight is such as to not be detrimental to the movement of the machine, in which the movable welding points are power actuated, and wherein the controlling switch for the electrical current is directly associated on the portable unit so that its action is directly associated with the movable welding mechanism.

In the drawings:

Fig. 2 is an enlarged detail view of the moving mechanism.

Figure 1:
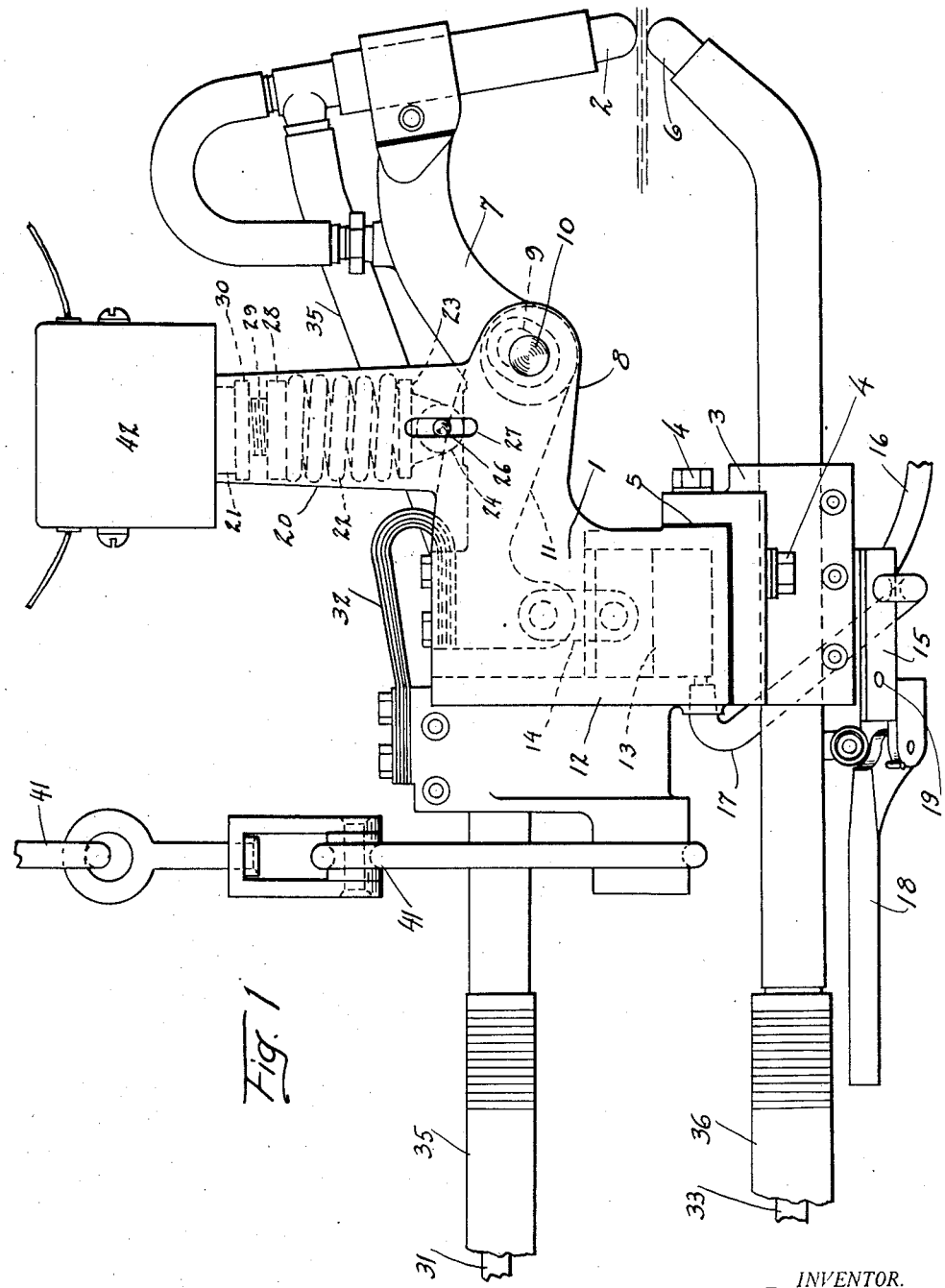
Fig. 1 is a side elevational view illustrating a portable welder constructed in accordance with the invention, with some of the structural features being shown in dotted lines.

The main body portion of the welder is illustrated at 1 and this body portion carries a welding point 2. A contact bracket 3 is secured to the body portion 1 by means of bolts 4, being insulated as at 5. This bracket carries welding point 6. The welding point 6 is stationary with respect to the body and contact bracket, whereas the welding point 2 is the movable one.

The mounting for the contact point 2 which permits of its movement, comprises a rocker arm 7 which carries the welding point. The body of the tool is provided with a pair of spaced projections 8, each provided with an elongated aperture 9 while the arm 7 carries a fulcrum pin 10 situated in the openings. The arm 7 has a heel portion 11. It will be noted that in accordance with this construction that the arm can rock on its pivot pin in such manner as to move the welding points toward and away from each other. In accordance with the present invention, this is accompanied by the application of power as distinguished from the hand operating method which has been heretofore proposed in portable welders.

For this purpose the body portion 1 is provided with a cylinder 12 having therein a piston 13 which is connected by means of a link 14 to the heel portion 11 of the rocker arm. Movement of the piston rocks the rocker arm. The preferred source of power is compressed air which is admitted to the cylinder to move the piston and exhausted from the cylinder to permit reverse movement of the piston. For this purpose a conventional valve construction may be employed. A suitable valve housing is illustrated at 15 leading into which is a compressed air supply hose 16 while a hose or conduit 17 leads from the valve housing to the cylinder. The valve may be controlled as by means of a suitable handle 18. It will be understood that any suitable valve construction may be employed so that when the valve handle is moved to operating position the conduits 16 and 17 are connected to permit compressed air to enter the cylinder and when the valve handle is moved back to original position, the supply hose 16 is cut off while the hose 17 is connected to the atmosphere as by a suitable exhaust port illustrated at 19. The specific valve housing is not claimed and its details need not be described but it may be said that an ordinary slide valve may be used.

Referring now to Fig. 2, it will be noted that the body portion has upstanding members as at 20 bridged as by means of a piece 21 for confining a coil spring 22. A plunger 23 is disposed at one end of the spring and this plunger is equipped with a roller 24, engaging a surface 25 on the rocker arm. This roller is carried by a pin 26 guided for vertical movement in slot 27 in the body member. The opposite end of the spring is butted against a nut 28, screw threaded on a stem 29 which has a head 30 butting against the cap piece 21.

The electric current for the welding points is transmitted through the means of a cable 31 having a connection with the body of the welder, and the body of the welder is in turn connected to the rocker arm as by means of a spring conductor element 32. A cable 33 connects directly into the contact bracket 3. As is the usual practice, the welding points may be cooled by a flow of cooling fluid such as water, through them. The interior of the welding points for this purpose is not shown as the same is well understood by those skilled in the art: suffice to say that hose 35 and 36 may be employed in which the cables are disposed that a flow of water may pass through the hose and also through the welding points.

This portable welder may be suspended from a cable or the like 40 connected to the welder as by means of suitable linkage 41 so that its weight is carried by the cable but at the same time so that it can be moved about and applied to work. When the welder has been applied to work as illustrated in Fig. 1, the operator manipulates the handle 18 to allow the air under pressure to enter the cylinder and this brings the welding points together to work as illustrated. By reference to Fig. 2, the operation will be better understood. Upon upward movement of the piston 13, the rocker arm 7 rocks on its fulcrum pin until the welding points contact with the work. When this occurs, the piston 13 being still acted upon by the air under pressure, continues in its movement and at this time the fulcrum pin 10 slides in the elongated slots. This action is resisted by the spring 22 which is compressed by this action. The spring is compressed by reason of the roller 24 which contacts with the surface 25. Accordingly, the welding points are applied to the work under spring action so that the welding pressure is substantially uniform throughout a plurality of separate welds. The pressure may be varied by adjustment of the nut 28.

The welding current is controlled in accordance with the movements of the welding points and accordingly, a switch construction is provided which is actuated from movements of the rocker arm. The switch comprises a housing 42 mounted on the members 20 and within this housing are contacts 43 and 44 carried by an insulation member 45. These contacts may advantageously be in the form of plungers as shown, acted upon by coil springs 46. A reciprocating rod 47 is associated with the plunger 23 and it carries a bridging member 48. In the operation of the welder, the rocker arm is moved and the welding points are applied to the work. Upon further movement of the piston the heel of the rocker arm is raised against the action of the spring 22 and the bridge member 48 is moved into a position to contact with and bridge the contact members 43 and 44. This establishes the welding current. Preferably, the circuit controlled by the switch just described is not the heavy welding circuit, but is merely a controlling circuit of much less amperage which, upon being made, makes the welding circuit as by means of a magnetic switch remotely positioned and not shown. This idea of a controlling circuit with a magnetically controlled switch is old and forms no essential part of the present invention.

I claim:

1. In a portable welder, a body member having a welding point, a second welding point opposing the first, a rocker arm carrying the second welding point, a fulcrum construction for the rocker arm comprising a fulcrum pin in an elongated slot, a spring normally holding the pin at one end of the slot, and means for rocking the rocker arm to bring the welding points together, said means being capable of movement so as to move the rocker arm after the welding points contact with the work whereby the said pin and elongated slot move relative to each other against the action of said spring.

2. In a portable welding machine, a relatively fixed welding point, a rocker arm carrying a relatively movable welding point, a pin and slot fulcrum construction for the rocker arm, means for rocking the rocker arm, a spring acting on the rocker arm normally holding the welding points separated and with the pin at one end of the slot, the moving means for the rocker arm having sufficient movement to move the same after the welding points are applied to the work so that relative movement between the pin and slot takes place against the action of the spring whereby the welding pressure of the points against the work is determined by the spring.

3. In a portable welding machine, a relatively fixed welding point, a rocker arm carrying a relatively movable welding point, a pin and slot fulcrum construction for the rocker arm, means for rocking the rocker arm, a spring acting on the rocker arm normally holding the welding points separated and with the pin at one end of the slot, the moving means for the rocker arm having sufficient movement to move the same after the welding points are applied to the work so that relative movement between the pin and slot takes place against the action of the spring whereby the welding pressure of the points against the work is determined by the spring, and means for adjusting the spring.

4. In a portable welding machine, a welding point, a rocker arm carrying a second welding point, a pin and slot fulcrum construction for the rocker arm, a spring, a roller associated therewith, a surface on the rocker arm for contact with the roller, said spring serving to hold the welding points normally separate, means for moving the rocker arm against the action of the spring to first bring the welding points against the work and then effect a relative movement of the pin and slot fulcrum construction against the action of the spring so that the welding pressure of the points is spring controlled, and a screw threaded abutting adjustment for the spring.

5. In a portable welding machine, the combination of a welder body, two welding points, at least one of which is movable relative to the other, means for moving the movable welding point, a spring acting upon the movable welding point so that welding pressure is spring controlled, an electric switch also carried by the portable welder body, means for closing the switch to make an electric circuit when the requisite spring pressure is attained by welding point movement, and means for adjusting the spring.

6. In a portable welding machine, a rocker arm for carrying a movable welding point, a pin and slot fulcrum construction for the rocker arm, means for moving the rocker arm, a spring acting on the rocker arm in opposition to the movement effected by said movement, a pair of contact members for an electrical circuit carried by the portable welder body, a bridge member for the contacts, means associating the bridging member with the rocker arm so that rocker arm movement effects flexing of the spring to effect a spring controlled welding pressure between the points and move the bridge against the contact members to make the electric circuit.

7. In a portable welding machine, a rocker arm for carrying a movable welding point, a pin and slot fulcrum construction for the rocker arm, means for moving the rocker arm, a spring acting on the rocker arm in opposition to the movement effected by said moving means, a pair of contact members for an electrical circuit carried by the portable welder body, a bridge member for the contacts, means associating the bridging member with the rocker arm so that rocker arm movement effects flexing of the spring to effect a spring controlled welding pressure between the points and move the bridge against the contact members to make the electric circuit, the parts being so co-ordinated that relative movement between pin and slot fulcrum construction of the rocker arm takes place after the welding points engage the work, whereby first the spring is flexed to get requisite welding pressure and then the contacts are bridged to effect a welding circuit.

In testimony whereof I have affixed my signature.

PETER W. FASSLER.